United States Patent [19]

Bierhoff

[11] Patent Number: 4,637,006
[45] Date of Patent: Jan. 13, 1987

[54] APPARATUS FOR PRODUCING DIGITAL INFORMATION FROM A TRANSMISSION MEDIUM

[75] Inventor: Martinus P. M. Bierhoff, Eindhoven, Netherlands

[73] Assignee: U.S. Philips Corporation, New York, N.Y.

[21] Appl. No.: 578,460

[22] Filed: Feb. 9, 1984

[30] Foreign Application Priority Data

Oct. 17, 1983 [NL] Netherlands ................ 8303563

[51] Int. Cl.⁴ .................................... H04N 5/76
[52] U.S. Cl. ........................................... 369/59
[58] Field of Search ................ 369/44, 45, 46, 59

[56] References Cited

U.S. PATENT DOCUMENTS 4,544,838 10/1985 Moska .................................. 369/46
4,561,081 12/1985 Janssen et al. ....................... 369/46

Primary Examiner—Vincent P. Canney
Attorney, Agent, or Firm—Thomas A. Briody; William J. Streeter; Marianne R. Rich

[57] ABSTRACT

An apparatus is described for reproducing digital information from an optically readable disc. In order to measure the phase difference between a channel clock and the intersections of the data signal being read with a decision level, samples on both sides of said intersections are interpolated and the amplitudes of the samples are compared with the decision level. The amplitude difference is a measure of the phase difference.

8 Claims, 7 Drawing Figures 4,637,006

APPARATUS FOR PRODUCING DIGITAL INFORMATION FROM A TRANSMISSION MEDIUM

BACKGROUND OF THE INVENTION

The invention relates to an apparatus for reproducing digital information from a transmission medium, in particular an optically readable record carrier on which digital information is stored in the form of a track of optically detectable areas which alternate with intermediate areas. The apparatus generally comprises:
oscillator means for generating a clock signal,
means for generating a decision level, and
means for comparing the signal obtained from the transmission medium with the decision level in order to restore the digital signal.

Such apparatus is used in the "compact-disc digital audio" player which is commercially available from N. V. Philips' Gloeilampenfabrieken under the type designation CD 100. In this player a signal is generated which is a measure of the phase difference between the clock signal and the time base of the reproduced signal. The time base is determined by the intersections of the reproduced signal and the decision level, in order to lock the phase of the clock signal to said intersections by means of a phase-locked loop. This signal which is a measure of the phase difference is determined by measuring the time intervals between said intersections and the edges of the clock signal. When the reproduced signal is comparatively weak, for example owing to finger marks on the disc, this time measurement becomes very unreliable because it responds to intersections of the decision level caused by noise and the like. This gives rise to an erroneous phase detection and a consequent detuning of the clock oscillator. In order to mitigate these problems the phase detection is therefore interrupted in the event of the signal drop-out. However, this interruption demands some time, so that nevertheless the clock oscillator may be detuned.

SUMMARY OF THE INVENTION

It is the object of the invention to provide an apparatus in which a phase detection is applied which is less susceptible to disturbances during signal drop-outs.

To this end the invention includes means for sampling the amplitude of the reproduced signal on both sides of first instants at which the reproduced signal intersects the decision level in a first of two possible directions, which sampling is effected in phase-synchronism with the clock signal.

Means are provided for generating a first signal which is a measure of the difference in amplitude between the decision level and an interpolation of the samples on both sides of said first instants.

When the phase difference is detected in accordance with the invention the first signal representing the phase difference is proportional to the slope of the reproduced signal around the intersections and hence proportional to the amplitude of this reproduced signal. In the case of signal drop-outs this amplitude becomes low, and the first signal is corresponding small and can hardly cause a detuning of the clock oscillator.

The apparatus in accordance with the invention may further have the means for sampling adapted to sample the amplitude of the reproduced signal on both sides of second instants at which the reproduced signal intersects the decision level in a second direction opposite to the first direction. A second signal is generated which is a measure of the difference in amplitude between the decision level and an interpolation of the samples on both sides of said second instants.

With respect to the generation of the first and the second signals the apparatus in accordance with the invention may provide for the first and the second signal to be generated in such a manner that the amplitudes of said signals satisfy the relationship k+1−2 m, where k and l are the amplitudes of the samples on both sides of the first or the second instants and m is the amplitude of the decision level.

As regards the control of the clock oscillator the apparatus in accordance with the invention may provide a signal which is proportional to the difference between the first and the second signal. This signal is applied to the oscillator means for controlling said oscillator means so that the phase of the clock signal is locked to the time base of the reproduced digital signal.

For an optimum restoration of the digital signal the decision level must be situated as symmetrically as possible. In order to achieve this the apparatus in accordance with the invention may provide a signal which is proportional to the sum of the first and the second signal. This sum is applied to the means for generating the decision level as a negative-feedback signal.

The sum of the first and the second signal is proportional to the difference between the phase differences between the clock signal and the intersections of the reproduced signal with the decision level in both directions. This difference is minimized by the negative feedback.

BRIEF DESCRIPTION OF THE FIGURES

The invention will now be described in more detail, by way of example, with reference to the drawings, in which.

DESCRIPTION OF THE PREFERRED EMBODIMENT

Figure 1:
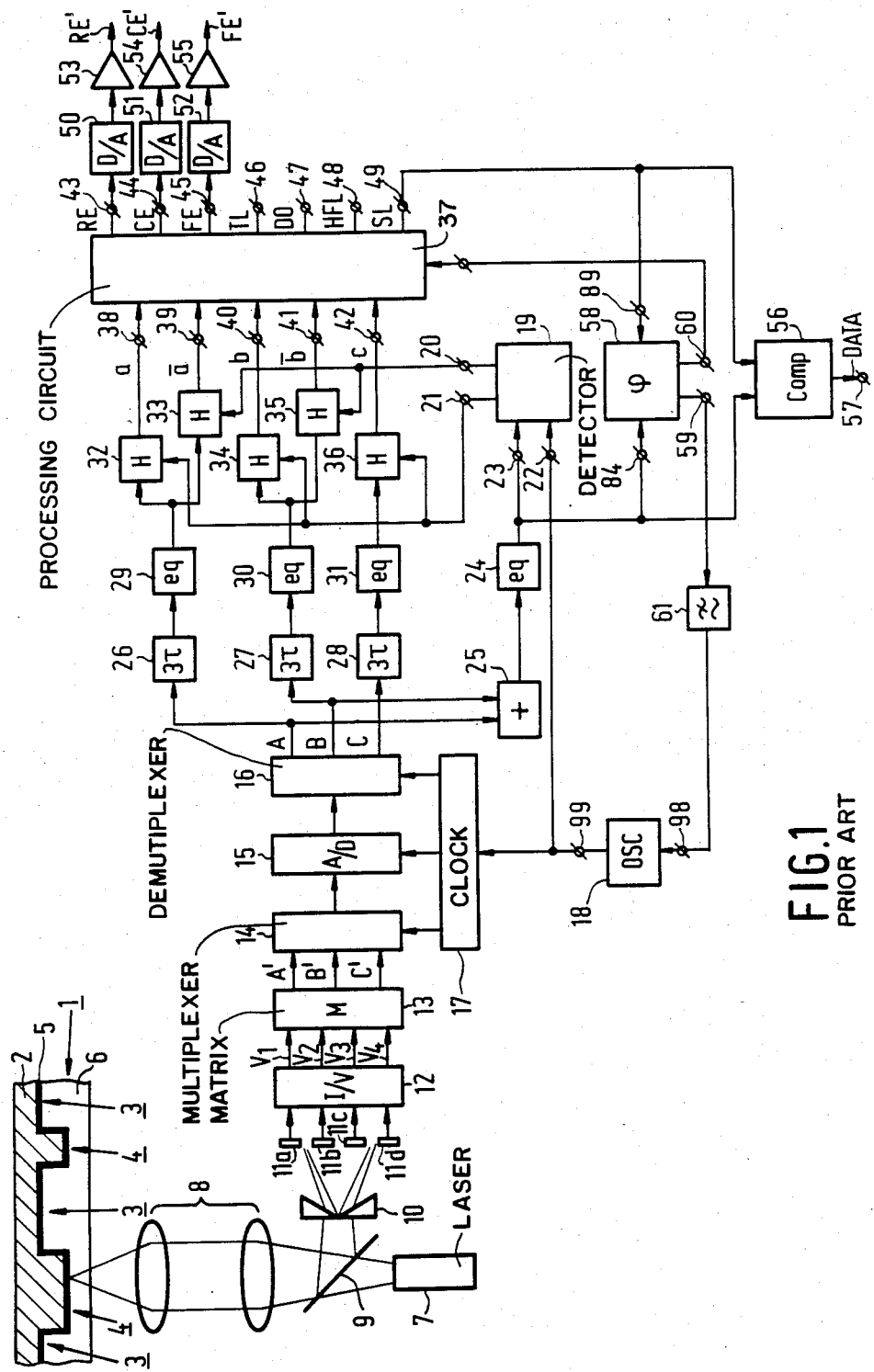
FIG. 1 is a block diagram of an apparatus in which the phase detector in accordance with the invention may be used.

In FIG. 1 a disc-shaped record carrier 1 is shown in a schematic cross-sectional view. This record carrier comprises a substrate 2 in which a track structure is formed, which structure comprises pits 3 and intermediate areas 4. This relief-type track structure is coated with a reflecting layer 5 and a transparent protective layer 6. The information contained in the relief-type track structure is read by a laser beam generated by a laser 7. The beam is projected and focused on the tracks by a lens system 8, the reflected beam being projected on an in-line array of four optical detectors 11a, 11b, 11c and 11d by a semi-transparent mirror 9 and a beam splitter 10. The currents supplied by these photodetectors are converted into the signal voltages $V_1$, $V_2$, $V_3$ and $V_4$ by means of a current-voltage converter 12.

For a correct read-out the focusing of the lens system 8 is controlled in a manner, not shown, by a focusing control signal FE'. For radial tracking the radial location of the spot produced by the laser beam is controlled by a radial control signal RE'. This is fine-control system. Coarse control is obtained (in a manner not shown) by moving the entire optical system 7, 8, 9, 10, 11 in a radial direction under command of a control signal CE'.

The control signals CE', RE' and FE' are derived from the signal voltages $V_1$, $V_2$, $V_3$ and $V_4$. In addition to the sum $V_1+V_2+V_3+V_4$ required for recovering the high-frequency data signal, the signal $(V_1+V_4)-(V_2+V_3)$ is required for the signal FE' and the signal $(V_1+V_2)-(V_3+V_4)$ is required for the signal CE' and the signal RE'. All these control signals can be derived from three signals A', B' and C' which are obtained by combining the signals $V_1$, $V_2$, $V_3$ and $V_4$. In the present embodiment these signals are related as follows:

$$A' = V_1 + V_2$$

$$B' = V_3 + V_4$$

$$C' = V_1 + V_4$$

The combination of the signals $V_1$, $V_2$, $V_3$ and $V_4$ described in the foregoing is obtained by means of a matrix 13. This combination has the advantage that only three instead of four signals must be digitized, so that a local lower clock frequency is required. Signals A', B' and C' are converted into serial form by means of a multiplexer 14. They are then digitized in an analog-to-digital converter 15 and reconverted into parallel form to obtain the corresponding digital samples A, B and C by means of a demultiplexer 16. Multiplexer 14, analog-to-digital converter, and demultiplexer 16 receive clock signals from a clock-signal generating circuit 17, which supplies the required clock signals in the correct phase relationship under control of an oscillator 18, in such a manner that the samples A, B and C are supplied in synchronism with the bit frequency of the data signal.

For generating the various control signals it is important to suppress the data-signal spectrum as far as possible. This is achieved by selecting samples in synchronism with the data pattern (pits and intermediate areas), so that the instantaneous sampling frequency becomes equal to the instantaneous frequency of the data signal. For this purpose one sample for each pit (3) and for each intermediate area (4) is selected from each of the samples A, B and C and, in order to minimize the effect of the optical transfer function of the read-out (the signal amplitude is a function of the location of the projected laser beam relative to the pits and decreases towards the edges of the pits). The samples are taken only for bits and intermediate areas which are longer than a specific number of clock periods, in the present example longer than 5 clock periods. For this purpose a detector 19 (which will be described in more detail with reference to FIG. 2) generates a pulse on an output 20 when the sixth sample in one pit is detected and a pulse on output 21 when the sixth sample in one intermediate area is detected. The detector 19 receives the clock signals from the oscillator 18 on an input 22 and the digital sum of the signals A and B, obtained by means of the adder 25 and equalized by means of the circuit 24, on an input 23.

The samples A, B and C are each delayed by three clock periods ($\tau$) of the oscillator 18 by means of delay networks 26, 27 and 28 respectively. They are equalized by means of the equalizers 29, 30 and 31 respectively, and are applied to the hold circuits 32 and 33, 34 and 35, and 36 respectively. The hold circuits 32, 34 and 36 are clocked by the signal on output 21 of detector 19 while hold circuits 33 and 34 are timed by the signal on output 20. During each intermediate area longer than five periods the third samples a, b and c of the samples A, B and C respectively then appear on the outputs 38, 40 and 42 respectively of hold circuits 32, 34 and 36, respectively. During each pit which is longer than five clock periods the third samples a and b of the samples A and B respectively appear on the outputs 39 and 41 respectively of the hold circuits 33 and 35 respectively.

The signals a, ā, b, b̄ and c are applied to a processing circuit 37, which supplies the signals RE, CE and FE on outputs 43, 44 and 45 respectively, and a signal TL representing a loss of track, a signal DO indicating signal drop-out, a signal HFL indicating that the level of the high-frequency data signal is too low, and a signal SL which is a decision level for data-signal processing, on outputs 46, 47, 48, and 49, respectively. The signals RE, CE and FE are converted into analog signals by means of digital-to-analog converters 50, 51 and 52 and subsequently they are amplified by the amplifier 53, 54 and 55 to form the analog control signals RE', CE' and FE' for the focusing the tracking control.

The sum of the signals A+B formed by means of adder 25 and equalizer 24 is not only applied to detector 19 but also to a comparator 56. Comparator 56 receives the decision level SL for restoring the digital data signal and applying it to an output 57. SL is also applied to a phase comparator circuit 58, which compares the phase of the samples A+B with the phase of the data signal on record carrier 1, and which supplies a signal which is a measure of this phase difference to an output 59. A signal which is a measure of the asymmetry of the signal A+B is furnished at an output 60, of comparator 58 and is applied to a circuit 37, which will be described in more detail with reference to FIG. 8. The phase-error signal on output 59 controls oscillator 18 through a low-pass filter 61.

Figure 2:
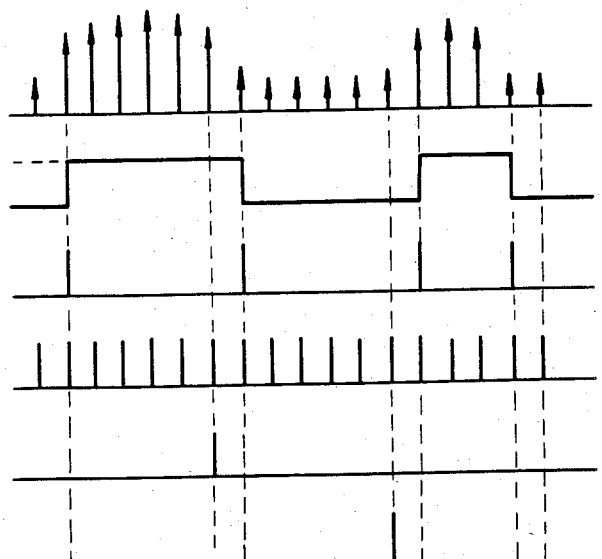
FIG. 2 shows an example of the detector 19 of the apparatus shown in FIG. 1.
Figure 3:
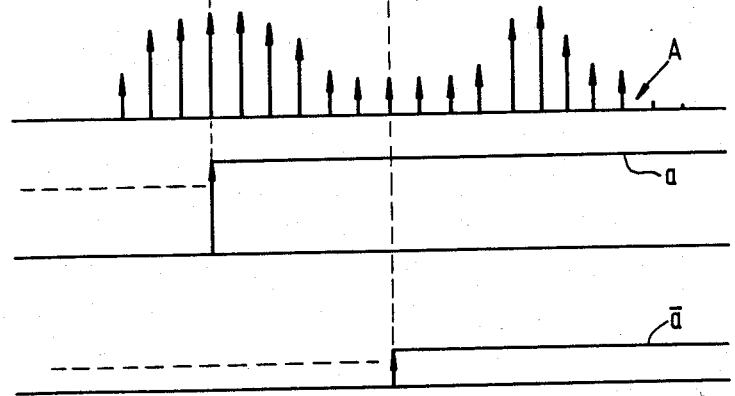
FIG. 3 show diagrams a–j to explain the operation of the detector shown in FIG. 2.
Figure 4:
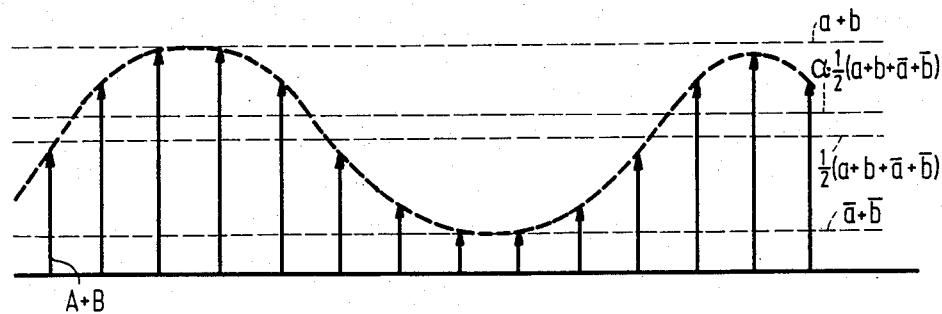
FIG. 4 is a diagram to explain the operation of the circuit shown in FIG. 5.

FIG. 2 shows an embodiment of the detector 19 of FIG. 1, and FIG. 3 shows some diagrams to explain the operation of the circuit shown in FIG. 2. In the circuit shown in FIG. 2 the signal A+B from equalizer 24 is applied to an input 23 of a high-pass filter 62 to remove the low-frequency components, thereby permitting the digital data signal to be restored by means of a simple comparator 63. The edges of the rectangular data signal are detected by means of a circuit 64, for example a differentiator. This edge detector starts a counter 65 which counts clock pulses from the oscillator 18 on its input 22 from the instant defined by the pulses from the edge detector 64. A decoder circuit 66 decodes a specific count, in the present example six. When the count "six" is reached, the pulses are applied to AND-gates 67 and 68. The gate 67 also receives the restored data signal on an inverting input and the gate 68 receives this signal on a non-inverting input. As a result of this, a pulse will appear on output 21 when the count "six" is reached during a positive data signal (3c) and on output 20 when the count "six" is reached during a negative data signal.

To illustrate this, FIG. 3a shows a part of a data track on the record carrier, which track comprises pits 3 and intermediate areas 4 between these pits. FIG. 3b shows the samples A+B originating from the track shown in FIG. 3a. FIG. 3c shows the restored data signal after the comparator 63, which is a substantially rectangular signal with a period corresponding to the length of the pits and intermediate areas. FIG. 3d shows the starting pulses for the counter 65 initiated at the edges of the data signal. The counter counts the pulses of the clock signal shown in FIG. 3e. The counter 65 supplies a pulse each time that the count "six" is reached. For a positive data signal (FIG. 3c), occurring during an intermediate area, a pulse will appear on output 21 (FIG. 3f), and for a negative data signal, i.e. during a pit, the pulse will appear on output 20 (FIG. 3g). The signals A, B and C, which have been delayed by three clock periods, are thus sampled. FIG. 3h shows the signal A which has been delayed by three clock periods and for which hold circuit 32 (FIG. 1) holds the third sample from each intermediate area longer than five clock periods (signal shown in FIG. 3i) and sample and hold circuit 33 holds the third sample from each pit longer than five clock periods (signal shown in FIG. 3j).

Figure 5:
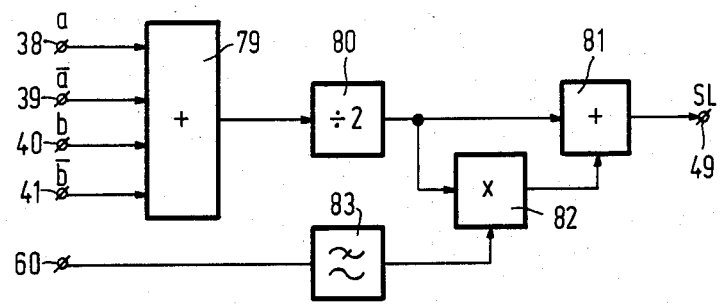
FIG. 5 shows an example of that part of the circuit 37 (FIG. 1) which supplies the signal SL.

In the apparatus shown in FIG. 1 the data signal A+B is applied to a comparator 56 for restoring the data signal. In this comparator the samples A+B are compared with a decision level Sl appearing on output 49 of the circuit 37. This decision level SL should be such that the restored data signal exactly corresponds to the pattern of pits on the disc. As is shown in FIG. 5, the signal A+B varies between the levels $a+b$ and $\bar{a}+\bar{b}$, which are the values of the signal A+B during the third sample of long pits and intermediate areas respectively. A first approach adopted for a decision level SL is halfway between said levels $a+b$ and $\bar{a}+\bar{b}$, so:

$$SL = \tfrac{1}{2}(a+b+\bar{a}+\bar{b}).$$

This approach is correct only if the signal A+B is symmetrical as regards its variation during the intermediate areas or pits, which is not always the case. Therefore, the level must be corrected by a factor $\alpha$ which is a measure of the asymmetry of the signal A+B. For generating this factor $\alpha$ reference is made to FIGS. 6 and 7.

FIG. 5 shows an example of that part of the circuit 37 which generates the decision level SL. By means of an adder 79 the sum of the samples a, $\bar{a}$, b, and $\bar{b}$ is determined and this sum is halved by a divider 80. The resulting value $\tfrac{1}{2}(a+\bar{a}+b+\bar{b})$ must be multiplied by a factor $\alpha$ in order to correct for asymmetries. However, multiplying by said factor $\alpha$ means that a fast multiplier must be used in order to cope with comparatively rapid variations of $\tfrac{1}{2}(a+b+\bar{a}+\bar{b})$. It is more effective to multiply by a factor $\alpha = (1+e)$ instead of by the factor $\alpha$, which means that a fraction of the output signal of the divide-by-two circuit 80 must be added to the output signal by means of adder 81. This fraction e is obtained by means of a multiplier 82. Using a low-pass filter 83, the factor e is derived from a signal on output 60 of the phase comparator 58 (FIG. 1). This has the advantage that the multiplier 82 need not be fast, because the factor e varies comparatively slowly in comparison with the value $\tfrac{1}{2}(1+b+\bar{a}+\bar{b})$. Another advantage of this solution is that when the levels $a+b$ and $\bar{a}+\bar{b}$ after one long pit and one long intermediate area are known after the control system has become operative a reasonably reliable decision level $SL = \tfrac{1}{2}(a+b+\bar{a}+\bar{b})$ will appear on output 49 even before the correction factor e is known.

Figure 6:
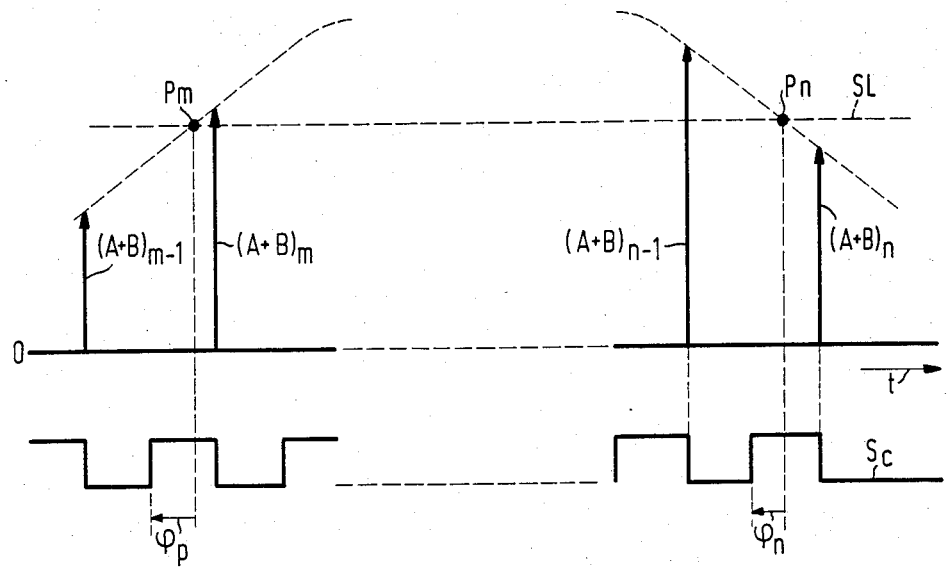
FIG. 6 is a diagram to explain the operation of the circuit shown in FIG. 7.
Figure 7:
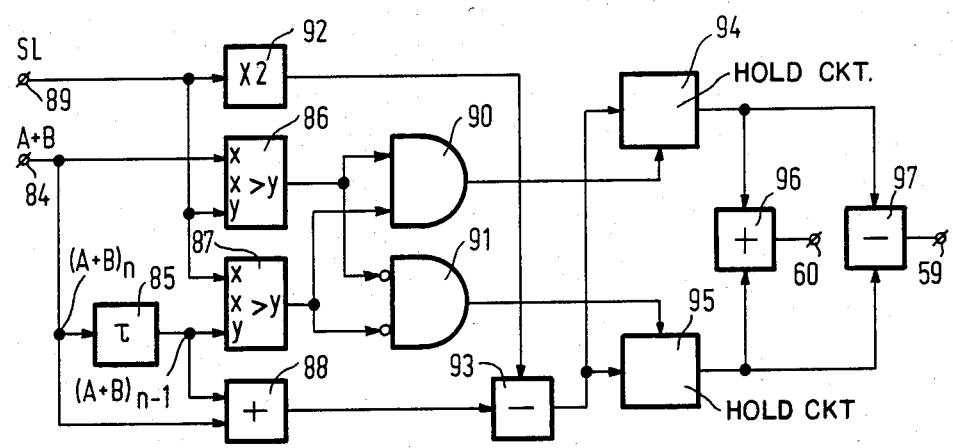
FIG. 7 shows an example of the phase detector 58 (FIG. 1) in accordance with the invention.

FIG. 7 shows an embodiment of the circuit 58 (FIG. 1) for generating a signal which is a measure of the phase error of the clock signal relative to the data recorded on the disc and a signal which is a measure of the asymmetry of the signal A+B and which must be applied to the circuit shown in FIG. 5 for correcting the decision level SL. The operation of the circuit shown in FIG. 7 will be described with reference to FIG. 6, in which $(A+B)_{n-1}$ and $(A+B)_n$ are two consecutive samples of the signal A+B situated on different sides of the decision level SL. Assuming that the analog signal, of which $(A+B)_{n-1}$ and $(A+B)_n$ are two samples, varies linearly between these samples, the point of intersection $P_n$ with said decision level can be determined by linear interpolation.

The relative deviation of this intersection $P_n$ relative to an instant which is situated exactly halfway between the instants at which the samples $(A+B)_{n-1}$ and $(A+B)_n$ appear is then a measure of the instantaneous phase difference between the clock signal with which the instants at which the samples $(A+B)_n$ and $(A+B)_{n-1}$ are synchronized and the edges of the pits 3, and consequently of the instantaneous phase difference with the bit frequency of the recorded data signal. In FIG. 6 this clock signal bears the reference $S_C$ and the phase difference bears the reference $\phi_n$. For the intersection $P_m$ with the decision level SL between the samples $(A+B)_m$ and $(A+B)_{m-1}$ corresponding to the other edges of the pits 3 an instantaneous phase difference $\phi_p$ can be determined in the same way.

The sum $\phi_p + \phi_n$ is now a measure of the average phase deviation of the two edges and is consequently a measure of the phase error of the clock oscillator 18, while the difference between the phase errors $\phi_p$ and $\phi_n$ is a deviation of the decision level SL from the desired level. Indeed, if the level SL rises, $\phi_p$ increases and $\phi_n$ decreases, so that the difference $\phi_p - \phi_n$ increases in a positive sense. If the level SL decreases below the desired level, this difference $\phi_p - \phi_n$ becomes negative.

Therefore, the difference, $\phi_p - \phi_n$ is a measure of the correction factor e for the circuit shown in FIG. 5. The phase difference $\phi_n$ and $\phi_p$ can be determined as follows by linear interpolation:

$$a\phi_n = (A+B)_{n-1} + (A+B)_n - 2SL, \text{ and}$$

$$-a\phi_p = (A+B)_{m-1} + (A+B)_m - 2SL$$

where a is a factor which depends on the slope of the interpolation line and which is therefore proportional to the amplitude of the data signal being read. The desired signals are generated by means of the circuit shown in FIG. 7. The samples A+B are applied to an input 84 which is connected to a device 85 which delays the sample by one clock period $\tau$, so that the samples $(A+B)_m$ and $(A+B)_{m-1}$ appear on the input and the output respectively of said device in the case of an intersection of the level SL during a positive-going edge, and the samples $(A+B)_n$ and $(A+B)_{n-1}$ in the case of an intersection during a negative-going edge. The decision level generated by the circuit shown in FIG. 5 is applied to an input 89. This decision level SL together with the signal on input 84 is applied to a comparator 86, which produces an output signal when the signal on input 84 exceeds the decision level SL. The delayed signal on the output of the delay network 85 and the decision level are applied to a comparator 87 which produces an output signal when the decision level SL is higher than the signal on the output of the delay network 85. The output signals of the two comparators 86 and 87 are applied to an AND-gate 90 and a NAND-gate 91 so that AND-gate 90 produces a signal in the case of an intersection of the decision level SL during a positive-going edge and NAND-gate 91 produces an output when decision level SL is intersected during a negative-going edge. By means of an adder 88 the signals obtained on both sides of the delay element 85 are added to each other and subsequently twice the decision level SL, which is obtained by means of the multiplier 92, is subtracted therefrom by means of a subtractor circuit 93. The result is sampled by a hold circuit 94 under command of the gate 90 and by a hold circuit 95 on control of the gate 91, so that the signal on the output of the hold circuit 94 is equal to a $\phi_n$ and the signal on the output of the circuit 95 is equal to $-a\phi_p$. These signals are subtracted by means of a subtractor circuit 97, so that on the output 59 of this circuit a signal equal to $a(\phi_n + \phi_p)$ appears, which is a measure of the phase error of the clock 18, with which signal the oscillator 18 is corrected through the low-pass filter 61 in order to ensure that the clock signal has a fixed phase relationship with the recorded data signal. The signals on the outputs of the two hold circuits are added by the adder 96, so that on output 60 of this adder a signal equal to $a(\phi_n - \phi_p)$ appears, which is the signal which is a measure of the asymmetry. This signal is applied to a device for generating the threshold level (FIG. 5), so that a control loop is obtained which controls the height of the threshold level in such a manner that the signal $a(\phi_n - \phi_p)$ goes to zero or the phase difference $\phi_n$ (FIG. 6) becomes equal to the phase difference $\phi_p$.

The signals appearing on outputs 59 and 60 are proportional to the amplitude of the signal A+B. This has the advantage that during signal drop-outs the generated signals become zero, so that the oscillator 18 and device shown in FIG. 5 will receive no signal instead of a comparatively large spurious signal, which often happens in the customary phase detectors.

What is claimed is:

1. An apparatus for reproducing digital information from an optically readable record carrier having a track of optically detectable areas alternating with intermediate areas, comprising:
   oscillator means for generating a clock signal;
   means for reading digital information from said track and furnishing readout signals corresponding thereto;
   means for generating a decision level;
   means for comparing said readout signals with said decision level to regenerate a recorded digital signal, said apparatus further comprising:
   means for sampling the amplitude of said readout signals on each side of first instants in time at which said readout signals intersect said decision level in a first of two possible directions of signal amplitude changes, said sampling occurring in phase-synchronism with the clock signal; and
   means for generating a first signal which is a measure of the difference in amplitude between the decision level and an interpolated level of the samples on each of said sides of said first instants in time.

2. An apparatus as claimed in claim 1, wherein the means for generating the first signal generate a first signal which complies with the function k+1−2m, where k and l are the amplitudes of the samples on each side of the first instants in time and m is the amplitude of the decision level.

3. An apparatus as claimed in claim 1, wherein said first signal is applied to the oscillator means for controlling said oscillator means to lock the phase of the clock signal to the time base of the reproduced digital signal.

4. An apparatus as claimed in claim 1, wherein the means for sampling samples the amplitude of the reproduced signal on each side of second instants in time at which the reproduced signal intersects the decision level in a second direction opposite to the first direction, and means for generating a second signal are provided which is a measure of the difference in amplitude between the decision level and an interpolated level of the samples on each side of said second instants in time.

5. An apparatus as claimed in claim 4, wherein the first and the second signal are generated to have amplitudes satisfy the relationship k+1−2m, where k and l are the amplitudes of the samples on each sides of the first and the second instants, and m is the amplitude of the decision level.

6. An apparatus as claimed in claim 4, wherein a signal which is proportional to the difference between the first and the second signal is applied to the oscillator means for controlling said oscillator means so that the phase of the clock signal is locked to the time base of the reproduced digital signal.

7. An apparatus as claimed in claim 4, wherein, a signal which is proportional to the sum of the first and second signal is applied to the means for generating the decision level as a negative-feedback signal.

8. An apparatus as claimed in claim 7 wherein said means for generating said first signal and means for generating said second signal comprises:
   means for delaying said samples of the reproduced signal taken in synchronism with said clock signal one clock period of said clock signal;
   means for adding undelayed samples of said reproduced signal with delayed samples from said means for delaying;
   means for subtracting from a signal from said means for adding a signal which is twice the level of said decision level;
   a first hold circuit for storing after each of said first instants in time a signal from said means for subtracting whereby said first signal is formed; and
   a second hold circuit for storing after each of said second instants in time a signal from said means for subtracting whereby said second signal is formed.

* * * * *